United States Patent [19]

Poehler

[11] 4,357,770

[45] Nov. 9, 1982

[54] CONTROL PANEL FOR A MICROFICHE READER

[75] Inventor: Hermann Poehler, Ober-Mörlen, Fed. Rep. of Germany

[73] Assignee: MAP Mikrofilm Apparatebau Dr. Poehler GmbH & Co. KG, Ober-Möerlen, Fed. Rep. of Germany

[21] Appl. No.: 212,678

[22] Filed: Dec. 3, 1980

[30] Foreign Application Priority Data

Dec. 13, 1979 [DE] Fed. Rep. of Germany ....... 2950167

[51] Int. Cl.³ ............................................. G02B 27/02
[52] U.S. Cl. ...................................................... 40/361
[58] Field of Search ............... 40/361, 362, 10, 158 B

[56] References Cited

U.S. PATENT DOCUMENTS

| 3,201,883 | 8/1965 | Schleisner-Meyer | 40/361 |
| 3,246,412 | 4/1966 | Sommerhoff | 40/361 |
| 3,456,372 | 7/1969 | Shoenfeld et al. | 40/361 |
| 3,478,453 | 11/1969 | Brodsky | 40/361 |
| 3,707,792 | 1/1973 | Mabree et al. | 40/361 |

FOREIGN PATENT DOCUMENTS 2747343 4/1978 Fed. Rep. of Germany ........ 40/361

*Primary Examiner*—Gene Mancene
*Assistant Examiner*—Wenceslao J. Contreras
*Attorney, Agent, or Firm*—Michael J. Striker

[57] ABSTRACT

A control panel for a microfiche reader includes an alphabetic keyboard having a plurality of buttons arranged in parallel rows and a numeric keyboard carrying numeral index images. Each row of the buttons is provided with an index carrier carrying a plurality of indicia. Each of this indicia corresponds to a row of images extending along one of the coordinate axes. These index carriers are switched to a plurality of positions to thereby align the respective indicia with the associated button which is pushed to locate the row of images in which the individual image to be retrieved is located. The second keyboard is thereafter used to locate the individual image in the row of images found by the first keyboard.

11 Claims, 3 Drawing Figures

CONTROL PANEL FOR A MICROFICHE READER

BACKGROUND OF THE INVENTION

The invention pertains to a microfiche reader and more particularly to a control device adapted to locate individual images to be viewed on a microfiche.

Information storage and retrieval on microfiches are commonly used in practice. The microfiches known in the art usually have a size of 105×148 mm but may also have different dimensions, such as e.g. 180×240 mm. In a reading device known in practice, a microfiche is shifted along two mutually normal coordinate axes. In order to retrieve individual images to be viewed on the microfiche one should first of all to locate a first of images on a selected microfiche. In the commonly known microfiches the symbols or indica indicating letters or alphabetic signs and positioned in horizontally extending rows of images. When the desirable region of rows is found one actuates the respective button on a keyboard carrying alphabetic symbols and the microfiche is moved toward a lens system having an optical axis. The first image of the selected horizontal row appears then on a screen of the reading device. This image indicates an index field.

To further locate the desired individual image one must retrieve this image in a selected row of numeric keyboard as to move the microfiche along a second cordinate in order to place the desired section of the microfiche so as to intersect the optical axis of the lens system. As soon as the desired image is found on the numeric keyboard, the corresponding button on the numeric keyboard is pushed so that the selected image is automatically called up.

The above-described system of locating of individual images to be viewed on a microfiche enables one to substantially more quickly retrieve an individual image from microfiches that it is possible to do from micro films. However, in practice there is a need to further accelerate the process of locating individual images on a microfiche.

SUMMARY OF THE INVENTION

It is an object of the invention to provide an improved microfiche reader.

Another object of the invention is to provide a control device for a microfiche reader in which location of individual images to be viewed on a microfiche is substantially accelerated.

Still another object of the invention is to provide a microfiche reader which is easy to use and inexpensive in manufacture.

These and other objects of the invention are attained by a control device for a microfiche reader for microfiches carrying a plurality of images arrayed along two mutually normal coordinate axes, said microfiche being adapted to be moved along said coordinate axes for locating individual desired images to be viewed, the devices comprising a first keyboard having a plurality of buttons with respective index images; a second keyboard also having a plurality of buttons with respective index images; and at least one index carrier carrying a plurality of indicia each corresponding to a row of images extending along one of said coordinate axes, said index carrier being adapted to be switched to a plurality of positions so that respective indica are positioned adjacent respective associated buttons of said first keyboard to indicate the row image of images in which the desired individual image to be viewed is located, which individual image is thereafter finally retrieved by operation of said second keyboard.

The first keyboard may be adapted to locate a row of images extending along a horizontal coordinate axis so that by operation of said first keyboard a microfiche is moved in a vertical direction and said second keyboard may be adapted to locate an individual image lying in said row of images so that by operation of said second keyboard a microfiche is moved in a horizontal direction to display the desired image to be viewed.

Said plurality of buttons of said first keyboard may be positioned in a plurality of button rows arrayed parallel one to another.

Each of said button rows may be provided with an assigned index carrier each having a longitudinal axis which extends parallel to the assigned button row.

Each of said index carriers may be provided with a head having an outer surface carrying said plurality of indicia, said head being rotatable about said axis extending parallel to the assigned button row.

The outer surface of said head may have a polygonal shape.

The polygonal surface may have a plurality of sides, the indica on each of said sides being positioned one after another and arrayed in rows corresponding to the assigned button rows.

The heads of said index carriers may be rotatable synchronously with one another.

When a microfiche is to be exchanged all the index carriers are simultaneously switched or rotated by one individual switch mechanism so that new indica on the index carriers are viewed adjacent the rows of buttons on the first keyboard.

Said index carriers may be interchangeable so that in each required case the required symbols are positioned near the assigned row of the first keyboard.

The advantage of the control device according to the invention resides first of all in that a user is able not only to automatically locate an image field on a microfiche to be used but to find a predetermined row in which the desired image is positioned. Moreover, one can after locating the desired row of images push the button near the index carrier which indicates the number of the desired row and to control this desired row directly. By these means the process of retrieving individual images to be viewed is substantially accelerated as compared to that known in the art.

In accordance with the invention in order to futher decrease the probability of a malfunction of a microfiche reader, a user does not start the reader when the whole index field corresponding to a desired row is viewed but he first observes and then pushes the button on a keyboard directly near the index to be located after the desired row has been found.

The procedure of locating of individual rows of images is substantially facilitated when the index carrier is provided with indicia indicating these individual rows. When microfiches serve, for example for showing data and prices of the installation devices to which they are connected, the image symbols arranged on the index carriers may illustrate such pictures as, for example a washing tank, a kitchen sink or a hand basin or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
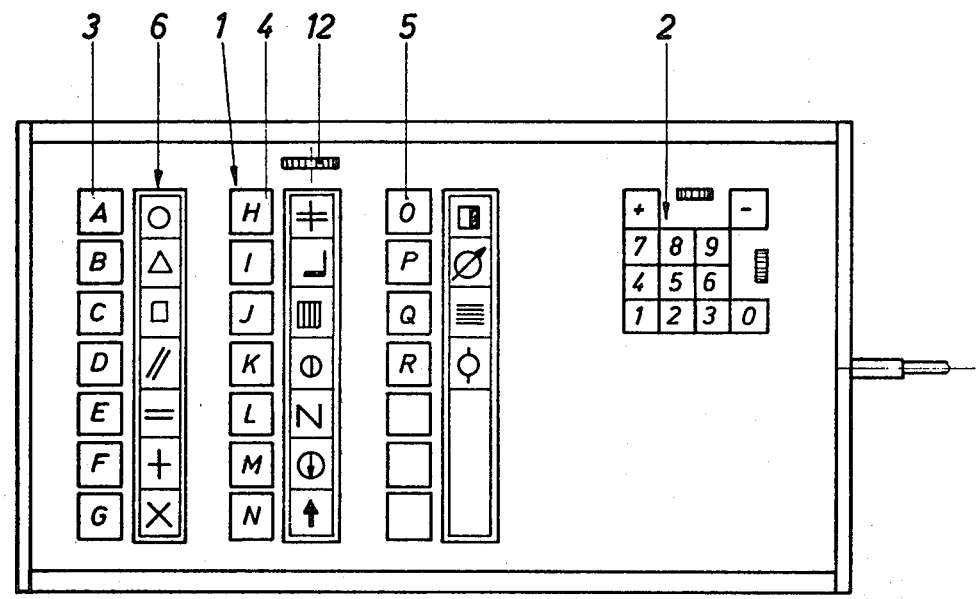
FIG. 1 is a diagrammatic top plan view of a control device of a microfiche reader according to the invention.

Referring to the drawings, and first to FIG. 1, a control device for an automatic microfiche reader includes an alphabetic keyboard generally denoted as 1 and a numeric keyboard 2. The alphabetic keyboard consists of three vertically extended rows 3, 4 and 5 of buttons carrying different signs or indexes and serving for starting up of an individual horizontally extending row of images of a microfiche.

The numeric keyboard 2 has ten buttons having numeric indexes on the surface thereon in commmonly known manner, which buttons may be used as "plus" push buttons and "minus" push buttons. Each individual image in the row of images may be controlled by the numeric keyboard. The numeric keyboard may also be utilized for selecting a next following image or a previous image to that one to be selected by pushing "plus" push buttons or "minus" push buttons.

In accordance with the invention, the alphabetic keyboard 1 is provided with switch index carriers 6. In the preferred embodiment described herein, three neighboring rows of buttons 3, 4 and 5 carrying the respective letters are utilized, and each of these rows is provided with a similar index carrier 6.

Figure 2:
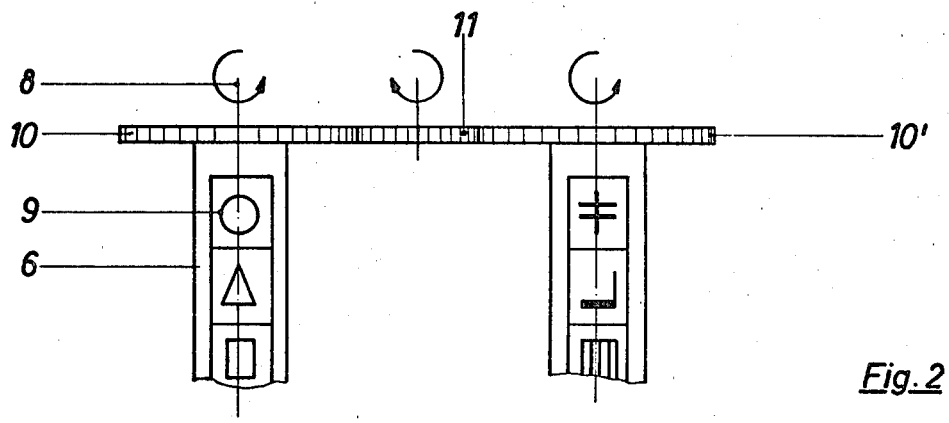
FIG. 2 is an enlarged partial view of an arrangement with two index carriers with a drive mechanism.
Figure 3:
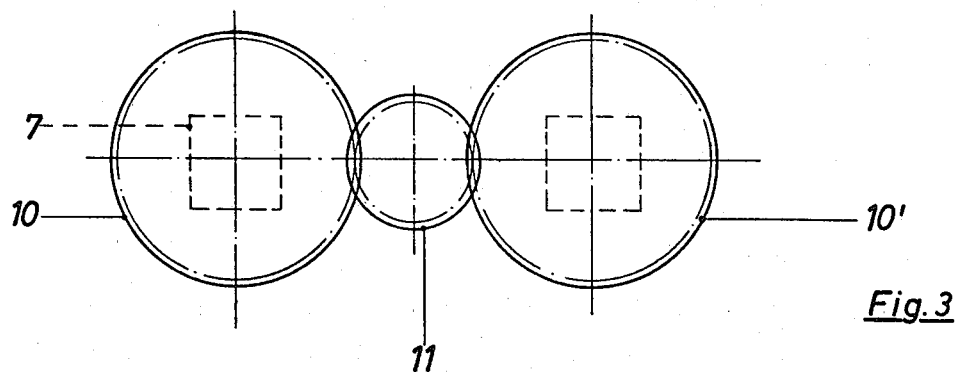
FIG. 3 is a diagrammatic top plan view of the arrangement shown in FIG. 2.

As may be clearly seen in FIGS. 2 and 3 each of the index carriers 6 (only two carriers are illustrated in FIGS. 2 and 3) includes a head 7 having a cross-section of substantially polygonal shape, for example, square shape. The head 7 has a longitudinal axis 8 about which head 7 is rotated. Indicia 9 in the form of image symbols positioned one after another are located on the surfaces of the head 7, which symbols correspond to the respective buttons in the rows 3, 4 or 5. Each of three index carriers 6 is rigidly connected to a respective gear 10 or 10'. The gears 10 and 10' are interconnected with one another by means of an intermediate gear 11 engaging gears 10 and 10' so that all the index carriers 6 can be rotated in synchronization.

A set wheel 12 illustrated in FIG. 1 serves to actuate the rotation of the gear 10 which causes through the intermediate gear 11 the synchronized rotation of the gear 10' and the further rotation of a gear provided for the third row 5 and not illustrated herein.

The operation of the control device of the invention is as follows. When one wishes to locate a desired image of the microfiche which image is positioned in a horizontally extended row of images one finds the respective symbol on one of the index carriers 6 and actuates the respective button which is adjacent the respective symbol. This results in appearance on a screen of the microfiche reader of a first image in this row which is an index image One can then read the number of the desired image in this row and thereupon operate the numeric keyboard 2 in order to finally locate the desirable image in the selected image row to thereafter automatically start up the microfiche device.

As known in the art, the microfiche is shifted along two mutually normal coordinate axes until a portion of the microfiche with the desired image intersects the optical axis of the lens system. In accordance with the invention, by operating the assigned button in one of the rows 3, 4 or 5 the microfiche is shifted along the vertical axis of coordinates so that the required row of images in which the desired individual image is positioned moves toward the optical axis of the lens system. By operating the second keyboard the microfiche in the known manner is moved along the horizontal axis of coordinates so that the desired image intersects the optical axis and is viewed on the screen of the microfiche reader.

It will be understood that each of the elements described above, or two or more together, may also find a useful application in other types of control device differing from the types described above.

While the invention has been illustrated and described as embodied in a control device it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a microfiche reader for reading micro-fiches carrying a plurality of images arrayed along two mutually normal coordinate axes, the microfiche being movable in the reader along said coordinate axes for locating individual desired images to be viewed in a known per se manner, the combination comprising a first keyboard having a plurality of buttons with respective index images; at least one turnable index carrier carrying a plurality of indicia each corresponding to a row of images extending along one of said coordinate axes, said index carrier being adapted to be switched to a plurality of positions to thus position the respective indicia thereon adjacent respective associated buttons of said first keyboard to indicate the row of images in which the individual desired image is located; and a second keyboard having a plurality of buttons with index images operative for retrieving the individual desired image in the row of images indicated by said first keyboard.

2. The combination of claim 1, wherein said plurality of buttons of said first keyboard are positioned in a plurality of button rows arrayed parallel one to another.

3. The combination of claim 2, wherein each of said button rows is provided with an assigned index carrier.

4. The combination of claim 3, wherein each of said index carriers has a longitudinal axis.

5. The combination of claim 4, wherein said axis extends parallel to the assigned button row.

6. The combination of claim 5, wherein each of said index carriers is provided with a head having an outer surface carrying said plurality of indicia, said head being rotatable about said axis extending parallel to the assigned button row.

7. The combination of claim 6, wherein said outer surface of said head has a polygonal shape.

8. The combination of claim 7, wherein said polygonal surface has a plurality of sides, the indica on each of said sides being positioned one after another and arrayed in rows corresponding to the assigned button row.

9. The combination of claim 8, wherein the heads of said index carriers are rotatable synchronously.

10. The combination of claim 9, wherein said index carriers are interchangeable.

11. The combination of claim 1, wherein said first keyboard is adapted to locate a row of images extending along a horizontal axis of coordinates and the second keyboard is adapted to locate an individual image lying in said row so that in the microfiche reader in operation of the first keyboard the microfiche is moved in a vertical direction and in operation of the second keyboard the microfiche is moved in a horizontal direction.

* * * * *